United States Patent [19]
Anderson

[11] Patent Number: 5,983,370
[45] Date of Patent: Nov. 9, 1999

[54] FOUR STATE TOKEN PASSING ALIGNMENT FAULT STATE CIRCUIT FOR MICROPROCESSOR ADDRESS MISALIGNMENT FAULT GENERATION HAVING COMBINED READ/WRITE PORT

[75] Inventor: Timothy D. Anderson, Dallas, Tex.

[73] Assignee: Texas Instruments Incorporated, Dallas, Tex.

[21] Appl. No.: 08/960,701

[22] Filed: Oct. 30, 1997

[51] Int. Cl.[6] .................................................. G06F 11/00
[52] U.S. Cl. ............................................ 714/49; 711/201
[58] Field of Search ................................. 714/49, 2, 3, 8, 714/9, 10, 15, 25, 27, 30, 50, 52; 364/247, 254.9, 259.2, 262.4, 262.81; 711/201, 220, 215; 395/375, 800

[56] References Cited

U.S. PATENT DOCUMENTS

| | | | |
|---|---|---|---|
| 5,568,624 | 10/1996 | Sites et al. | 395/373 |
| 5,596,717 | 1/1997 | Marshall, Jr. | 395/185.06 |
| 5,666,508 | 9/1997 | Marshall, Jr. | 711/201 |
| 5,742,755 | 4/1998 | Hervin | 395/185.06 |
| 5,761,491 | 6/1998 | Circello et al. | 395/591 |

*Primary Examiner*—Robert W. Beausoliel, Jr.
*Assistant Examiner*—Nadeem Iqbal
*Attorney, Agent, or Firm*—Robert D. Marshall, Jr.; Gerald E. Laws; Richard L. Donaldson

[57] ABSTRACT

A token passing structure controls alignment fault generation. An alignment fault state circuit stores one of four states corresponding to whether the operating system permits address misalignment fault generation and whether the application program requests such address misalignment fault generation. If the token is present in a particular latch, then the corresponding state is active. If the token is absent, then the corresponding state is inactive. The presence of the token in a predetermined one of the four states causes a fault gate qualifier signal to be active permitting fault generation on address misalignment. Absence of the token from that state causes the fault gate qualifier signal to be inactive prohibiting fault generation on address misalignment. This structure efficiently implements address misalignment fault control by means of token location. Every token location is accessible at every privilege level. An additional instruction not previously supported by Intel microprocessors and Intel compatible microprocessors permits the application program access to the individual token locations and thus to all the permitted states.

30 Claims, 3 Drawing Sheets

FOUR STATE TOKEN PASSING ALIGNMENT FAULT STATE CIRCUIT FOR MICROPROCESSOR ADDRESS MISALIGNMENT FAULT GENERATION HAVING COMBINED READ/WRITE PORT

CROSS REFERENCE TO RELATED APPLICATIONS

This application relates to improvements in the invention disclosed in the following copending U.S. patent application, which is assigned to Texas Instruments: U.S. patent application Ser. No. 08/478,308, entitled FOUR STATE TOKEN PASSING ALIGNMENT FAULT STATE CIRCUIT FOR MICROPROCESSOR ADDRESS MISALIGNMENT FAULT GENERATION filed Jun. 6, 1995.

TECHNICAL FIELD OF THE INVENTION

This invention generally relates to the field of microprocessors and more particularly to control of address misalignment fault generation.

BACKGROUND OF THE INVENTION

An address misalignment occurs whenever a generated address does not fit the boundary of a selected word size. The instruction set of Intel 8086, 80286, 80386, 80486 and Pentium microprocessors permits data access to any byte of memory. These microprocessors employ varying word sizes from 8 bits to 64 bits. It is known that references to misaligned addresses entail a performance penalty because some misaligned address references require two memory accesses. However, the later generations of these microprocessors retain the capability to generate and employ misaligned addresses to maintain compatibility with a large body of existing programs. Instruction set compatibility is a very important market factor for the personal computers employing these microprocessors.

A number of other microprocessors do not permit generation of misaligned addresses. Most particularly microprocessors in the RISC (Reduced Instruction Set Computer) class prohibit misaligned address generation. The regularized instruction set and memory accesses common to RISC microprocessors provide many advantages in speed of operation and processing power over the Intel microprocessors employed in most personal computers. To date this theoretical additional computational power of RISC microprocessors has not overcome the overwhelmingly larger base of application programs available for Intel microprocessors. Consequently, RISC microprocessors have found little success in mainstream general purpose personal computers.

It would be desirable in some applications employing Intel microprocessors to permit address misalignment fault generation. Certain AI (Artificial Intelligence) programs employ data typing within the generated address. If address misalignment faults could be selectively generated, then the least significant address bits could be employed to specify these data types. Upon address misalignment fault generation, a fault recovery program, more typically called an interrupt service routine, would access the word aligned address by masking the least significant bits of the address. At the same time the interrupt service routine would signal interrupted program of the data type for proper handling based upon these least significant bits indicating the data type. This technique, which is very useful in AI programs, permits run time specification of data types.

The prior art represented by U.S. Pat. No. 5,201,043 entitled "SYSTEM USING BOTH A SUPERVISOR LEVEL CONTROL BIT AND USER LEVEL CONTROL BIT TO ENABLE/DISABLE MEMORY REFERENCE ALIGNMENT CHECKING" employs a microprocessor based computer system having multiple privilege levels. The operating system has a high privilege level and has control over whether address misalignment fault generation is allowed. The application program has a low privilege level and has control over whether address misalignment fault generation is requested. The operating system stores individual bits in a control register CR0. In accordance with the Intel microprocessor architecture bit eighteen of this control register CR0 stores an alignment masking bit (AM) that allows or disallows address alignment fault detection. The application program stores individual bits in a flags register EFLAGS. In accordance with the Intel microprocessor architecture bit eighteen of the EFLAGS register stores an alignment check (AC) bit which indicates whether address misalignment fault generation is requested by the application program.

SUMMARY OF THE INVENTION

This invention employs a token passing structure for controlling alignment fault generation. This alignment fault state circuit stores one of four states corresponding to whether the operating system permits address misalignment fault generation and whether the application program requests such address misalignment fault generation. If the token is present in a particular latch, then the corresponding state is active. If the token is absent, then the corresponding state is inactive. The presence of the token in a predetermined one of the four states causes a fault gate qualifier signal to be active permitting fault generation on address misalignment. Absence of the token from that state causes the fault gate qualifier signal to be inactive prohibiting fault generation on address misalignment.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
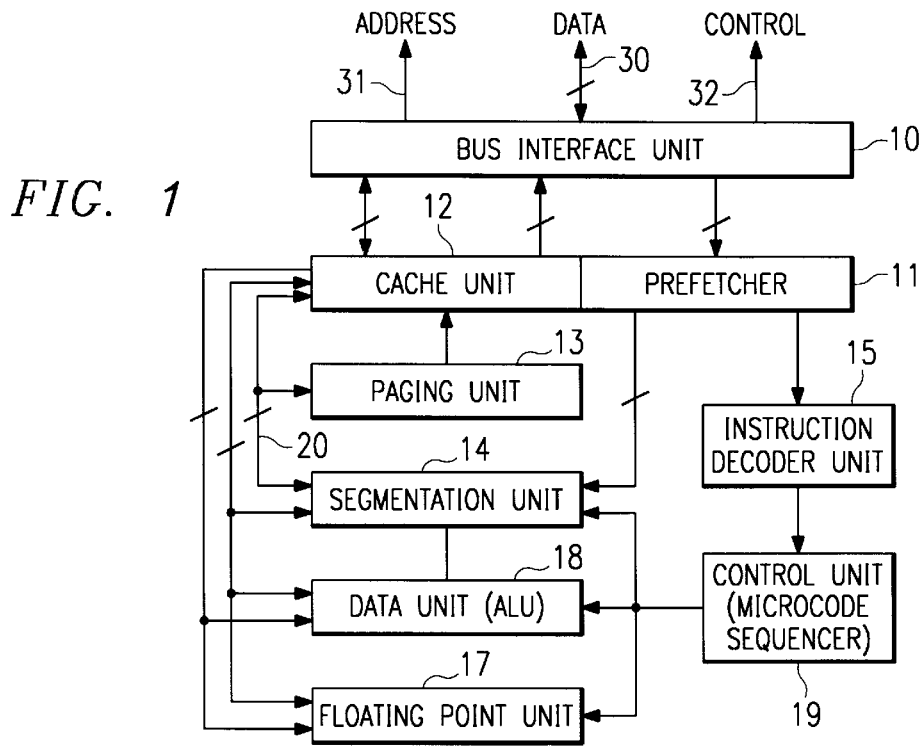
FIG. 1 is a general block diagram of a microprocessor of the type employing this invention.

FIG. 1 illustrates a prior art microprocessor of the type that may employ this invention. The microprocessor includes: bus interface unit 10; prefetcher 11, cache unit 12, paging unit 13, segmentation unit 14; instruction decoder unit 15; floating point unit 17; data unit 18; control unit 19; and internal address bus 20.

Bus interface unit 10 handles communication between the microprocessor and external units. Bus interface unit 10 couples to an external data bus 30, an external address bus 31 and several control lines 32. Bus interface unit 10 couples to prefetcher 11 and cache unit 12. Bus interface unit 10 deals with physical (hardware) addresses only, so operand addresses must first pass through paging unit 13 and segmentation unit 14. Cache unit 12 and prefetcher 11 also couple to bus interface unit 10. Prefetcher 11 continually requests bus interface unit 10 to fetch the contents of the memory at the next instruction address. As soon as prefetcher 11 receives the data, it places it in an instruction queue and, if the queue is not full, requests another word from memory. Cache unit 12 includes a data cache memory and a controller to control the accessing of the data cache memory.

Both prefetcher 11 and cache unit 12 are coupled to segmentation unit 14. Segmentation unit 14 translates segmented addresses into linear addresses used by the external memory system. Segmentation unit 14 is coupled to paging unit 13 and cache unit 12 via linear address bus 20. Linear address bus 20 is also called the "LA bus" (e.g., Linear Address). Paging unit 13 converts linear addresses generated by segmentation unit 14 into physical addresses that can be used by bus interface unit 10. If paging is disabled, then the linear address generated by segmentation unit 14 becomes the physical address. If paging is enabled in the Intel Pentium microprocessor, the linear addresses of the microprocessor are divided into either 4 Kbyte blocks or 4 Mbyte blocks called pages. Segmentation unit 14 can map each page into an entirely different address. For purposes of understanding the present invention, segmentation unit 14 may be assumed to be the same as that used in the commercially available Intel 80386 microprocessor. The segmentation and paging units for the Intel 80386 microprocessor are described in U.S. Pat. No. 5,321,836 entitled "MEMORY MANAGEMENT FOR MICROPROCESSOR".

Within the microprocessor instructions are coupled to the instruction decoder unit 15. Instruction decoder unit 15 operates in a manner similar to that of prefetcher 11. Instruction decoder unit 15 takes individual bytes from the prefetch queue and determines the number of bytes needed to complete the next instruction. Instruction decoder unit 15 operates with a control unit 19 in which microcode instructions are stored. Control unit 19 provides sequences of control signals for the microprocessor based upon the instructions decoded by instruction decode unit 15. Control unit 19 supplies these control signals to segmentation unit 14, data unit 18 and floating point unit 17. Data unit 18 is an arithmetic logic unit (ALU) which performs arithmetic and logic functions in a similar manner to those performed by the Intel 80386 microprocessor. The microprocessor also includes a floating point unit 17 for performing floating point computations.

The precise configuration the units of the microprocessor is not critical to the understanding of the present invention. Signal flow between the various units of the microprocessor will be discussed only insofar as needed to comprehend the present invention. Note that while FIG. 1 shows an example of a scaler microprocessor, which executes only a single instruction at a time, those skilled in the art would realize that this invention is equally applicable to a superscaler microprocessor, which is capable of executing more than one instruction simultaneously.

Figure 2:
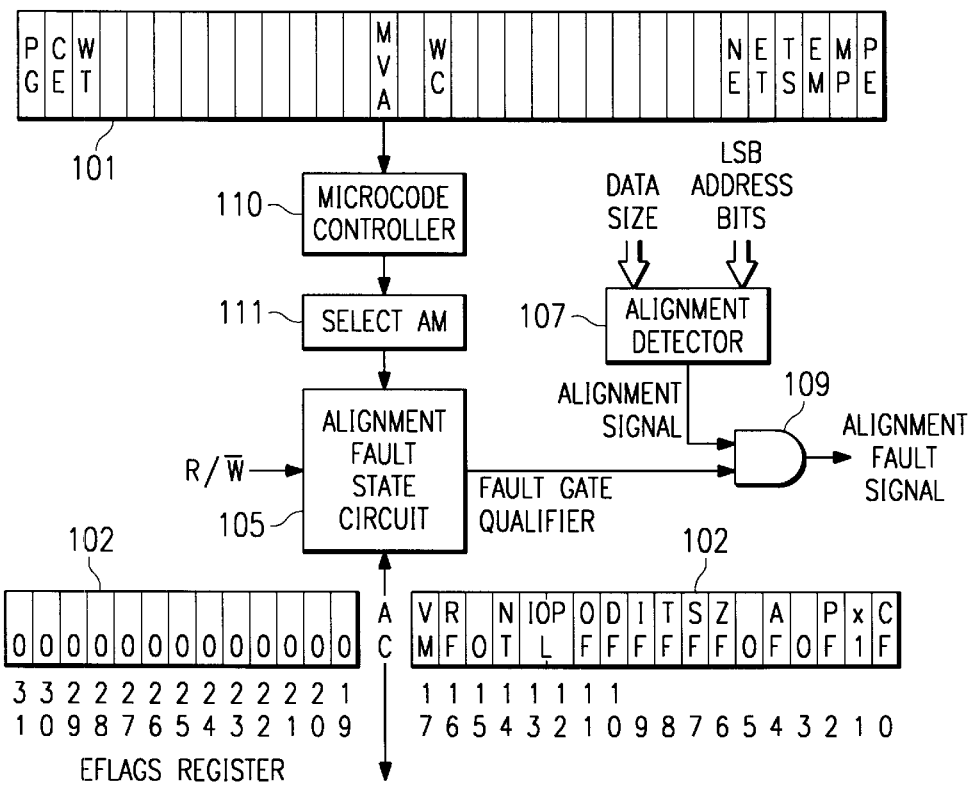
FIG. 2 is a block diagram of the relationship of the alignment fault circuit of this invention and the registers of the microprocessor.

FIG. 2 is a block diagram showing the relationship of the alignment fault circuit of this invention and a pair of registers. In the Intel architecture, a signal alignment masking (AM), which indicates whether or not the operating system permits alignment fault checking, is stored in a bit 18 of control register CR0 101. Other bits of control register CR0 101 store other quantities stored which are not important to this invention. Control register CR0 101 is one of several control registers which regulate the paging and numeric co-processor operation of the microprocessor. Control register CR0 101 is conventionally connected to other portions of the microprocessor for controlling operations. In particular, control register CR0 101 may be written into and read from a conventional bus, which is not illustrated in FIG. 2. Reading from control register CR0 101 is accompanied by and enabled by a control register read control signal designated CR0read. Writing to control register CR0 101 is accompanied by and enabled by a control register write control signal designated CR0write. Control register CR0 101 may be accessed only at the highest privilege level, which is assigned to the operating system. Note that in accordance with this invention, the meaning of the data stored in the control register CR0 101 memory location corresponding to bit 18 differs from the meaning according to the Intel architecture. In accordance with this invention, bit 18 of control register CR0 101 stores the MVA bit which generally reflects the values of a SELECT AM signal. This altered use of bit 18 of control register CR0 101 will be further explained below. The bus is coupled to bit 18 of control register CR0 101, however reads and writes to control register CR0 101 are handled differently than in the Intel architecture. The SELECT AM signal stored in SELECT AM register 111 is connected to alignment fault state circuit 105. This coupling is illustrated schematically in FIG. 2.

In the Intel architecture, a signal alignment check (AC), which indicates whether or not the application program requests alignment fault checking, is stored in a bit 18 of EFLAGS register 102. Other bits of EFLAGS register 102 have other quantities stored therein which are not important to this invention. Note that in the Intel 80386 bits 1, 3, 5, 15 and 19 to 31 of EFLAGS register 102 are undefined. These bits will always be read as "0" and writing to these bits has no effect. EFLAGS register 102 is conventionally connected to other portions of the microprocessor for controlling operations. In particular, EFLAGS register 102 may be written into and read from a conventional bus, which is not illustrated in FIG. 2. Reading from EFLAGS register 102 is accompanied by and enabled by an EFLAGS register read control signal designated EFLread. Writing to EFLAGS register 102 is accompanied by and enabled by an EFLAGS register write control signal designated EFLwrite. EFLAGS register 102 may be accessed at any level including the lowest privilege level, which is assigned to the application program. Note that in accordance with this invention, EFLAGS register 102 has a different physical structure corresponding to bit 18. Instead the bus coupling which would have been coupled to bit 18 of EFLAGS register 102 is directly connected to alignment fault state circuit 105. This coupling is illustrated schematically in FIG. 2 and illustrated in detail in FIG. 4.

The alignment fault check is selected on a task by task basis. Thus each such task has its own copy of the data stored in the EFLAGS register. One of the components of a task switch involves reading from EFLAGS register 102 and writing this data to main memory or disk. This preserves the state of the prior task for later recover upon return to this prior task. The EFLAGS data corresponding to the new task is transferred from main memory or disk to the EFLAGS register 102. This involves writing to EFLAGS register 102. The data corresponding to bit 18 of the EFLAGS register in the Intel architecture controls whether the current task requests alignment checking.

Alignment fault state circuit 105 saves the alignment fault generation controlling signals. It also generates a fault gate qualifier signal that controls whether address access misalignment faults are generated. Alignment fault state circuit 105 receives several signals. Firstly, alignment fault state circuit 105 receives the SELECT AM signal stored in SELECT AM register 111. Note that in accordance with the Intel convention, this bit 18 of control register CR0 stores the alignment masking AM. Alignment fault state circuit 105 also receives a R/$\overline{\text{W}}$ signal which indicates whether the current operation is a read or a write operation. The R/$\overline{\text{W}}$ signal normally indicates a read operation unless a write is actually taking place. Alignment fault state circuit 105 is connected to the register bus in place of bit 18 of the EFLAGS register in a manner that will be detailed in FIG. 4.

Alignment fault state circuit 105 generates 2 outputs. First, alignment fault state circuit 105 generates the fault gate qualifier signal. The fault gate qualifier signal indicates whether a fault may be generated upon detection of an address misalignment. Alignment fault state circuit 105 also supplies a signal corresponding to bit 18 of EFLAGS register 102 during receipt of an active the EFLread signal. Thus alignment fault state circuit 105 supplies this signal for instruction compatibility when an instruction reads EFLAGS register 102. Alignment fault state circuit 105 does not supply a signal on the control register bus corresponding to bit 18. Software compatibility is preserved using microcode in a manner that will be further explained below.

Alignment detector 107 makes the determination whether the generated address is aligned or misaligned. This determination is made based upon the least significant bits of the generated address and the data size. Current generation Intel microprocessors permit data sizes of 8 bits, 16 bits, 32 bits and 64 bits. In order to maintain compatibility with prior generations, all Intel microprocessors generate addresses at the byte (8 bit) level. Thus each address points to a particular byte in memory.

Table 1 shows the output of alignment detector 107 under various conditions of data size and least significant bits of the generated address. In Table 1 an "X" indicates a don't care condition. Thus bits designated "X" in Table 1 could be either "0" or "1".

TABLE 1

| Data Size | Address Bits 0-2 | Alignment Signal |
| --- | --- | --- |
| 8 bits | XXX | Aligned |
| 16 bits | XX0 | Aligned |
|  | XX1 | Not Aligned |
| 32 bits | X00 | Aligned |
|  | XX1 | Not Aligned |
|  | X1X | Not Aligned |
| 64 bits | 000 | Aligned |
|  | XX1 | Not Aligned |
|  | X1X | Not Aligned |
|  | 1XX | Not Aligned |

For a bit size of 8 all memory accesses are aligned. For a bit size of 16, memory accesses to an even address "XX0" are aligned but accesses to an odd address "XX1" are misaligned. For a bit size of 32, memory accesses to an address divisible by 4 are aligned. All other memory accesses are misaligned. Similarly for a bit size of 64, memory accesses to an address divisible by 8 are aligned and other accesses are misaligned. Those skilled in the art would be able to provide the appropriate logical hardware for alignment detection according to Table 1. For this reason alignment detector 107 will not be further described.

The fault gate qualifier signal and the alignment signal are combined in AND gate 109. The AND gate 109 generates an active alignment fault signal only if both the fault gate qualifier signal is active and the alignment signal indicates the address is not aligned. The alignment fault signal triggers a trap or interrupt in the program being executed. In order for proper operation, the operating system must be provided with an interrupt service routine to handle this interrupt. This interrupt service routine preferably makes appropriate adjustments and then returns control to the application program.

FIG. 2 further illustrates microcode controller 110 and SELECT AM register 111. Microcode controller 110 receives the MVA data stored bit 18 of control register CR0 101. Microcode controller 110 controls the data stored in SELECT AM register 111. During most operations of the microprocessor, the SELECT AM register 111 stores data identical to the MVA data stored in bit 18 of control register CR0 101. This data controls the state of the SELECT AM signal. However, during some read and write operations, microcode controller 110 may temporarily change the data stored in SELECT AM register 111. Note that the state of SELECT AM register 111 is controlled solely by microcode controller 110. The nature of this change of the SELECT AM signal will be described in detail below.

Figure 3:
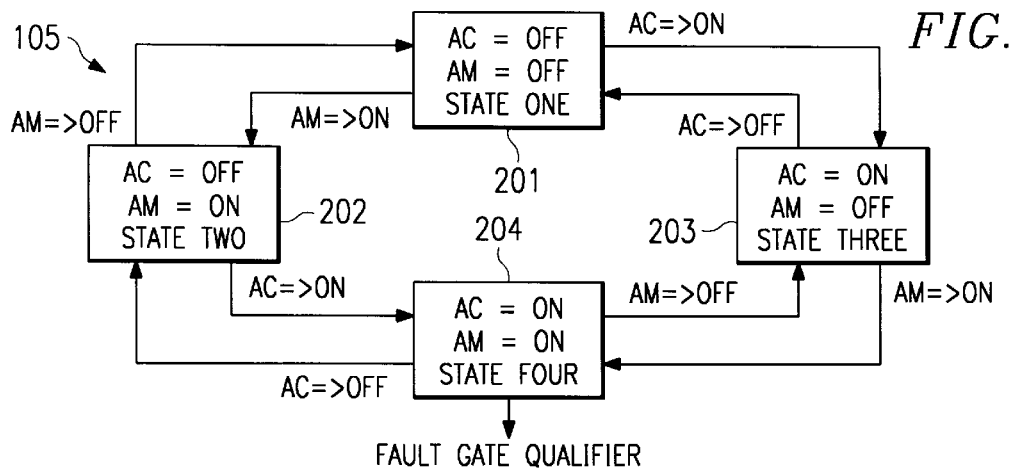
FIG. 3 is a state diagram of the states of the alignment fault state circuit of this invention.

FIG. 3 is a state diagram of alignment fault state circuit 105 reflecting the instruction set behavior. Alignment fault state circuit 105 includes four states designated state one, state two, state three and state four. Alignment fault state circuit 105 has four latches 201, 202, 203 and 204 with a single token passing between them. If the token is present in a particular latch, then the corresponding state is active. If the token is absent, then the corresponding state is inactive. Receipt of an operating system level alignment masking signal AM via a write to control register CR0 101 or of an application program level alignment check signal AC via a write to EFLAGS register 102 may cause a change of state to a neighboring state depending on the current state. The presence of the token in state four 204 causes the fault gate qualifier signal to be active permitting fault generation on address misalignment. Absence of the token from state four 204 causes the fault gate qualifier signal to be inactive prohibiting fault generation on address misalignment.

Alignment fault state circuit 105 is in state one 201 when both alignment check AC and alignment masking AM are OFF. No misalignment fault can be generated while in state one. A write to control register CR0 101 with bit 18 equal to "1" by operating system the sets alignment masking AM to ON. This changes the state to state two 202. A write to EFLAGS register 102 with a bit 18 equal to "1" by the application program sets alignment check AC to ON. This changes the state to state three 203. A write to control register CR0 101 or to EFLAGS register 102 with a bit 18 equal to "0" does not change alignment fault state circuit 105 out of state one 201.

Alignment fault state circuit 105 is in state two 202 when alignment check AC is OFF and alignment masking AM is ON. No misalignment fault can be generated when in state two 202. A write to control register CR0 101 with bit 18 equal to "0" by the operating system sets alignment masking AM to OFF. This changes the state to state one 201. A write to EFLAGS register 102 with a bit 18 equal to "1" by the application program sets alignment check AC to ON. This changes the state to state four 204. A write to control register CR0 101 with bit 18 equal to "1" or to EFLAGS register 102 with a bit 18 equal to "0" does not change alignment fault state circuit 105 out of state two 202.

Alignment fault state circuit 105 is in state three 203 when alignment check AC is ON and alignment masking AM is OFF. No misalignment fault can be generated when in state three 203. A write to control register CR0 101 with bit 18 equal to "1" by the operating system sets alignment masking to ON. This changes the state to state four 204. A write to EFLAGS register 102 with a bit 18 equal to "0" by the application program sets alignment check AC to OFF. This changes the state to state one 201. A write to control register CR0 101 with bit 18 equal to "0" or to EFLAGS register 102 with a bit 18 equal to "1" does not change alignment fault state circuit 105 out of state three 203.

Alignment fault state circuit 105 is in state four 204 when alignment check AC is ON and alignment masking AM is ON. In this state alignment fault state circuit 105 generates an active fault gate qualifier signal and thus a misalignment fault can be generated. A write to control register CR0 101 with bit 18 equal to "0" by the operating system sets alignment masking AM to OFF. This changes the state to state three 203. A write to EFLAGS register 102 with a bit 18 equal to "0" by the application program sets alignment check AC to OFF. This changes the state to state two 202. A write to control register CR0 101 or to EFLAGS register 102 with a bit 18 equal to "1" does not change alignment fault state circuit 105 out of state four 204.

Figure 4:
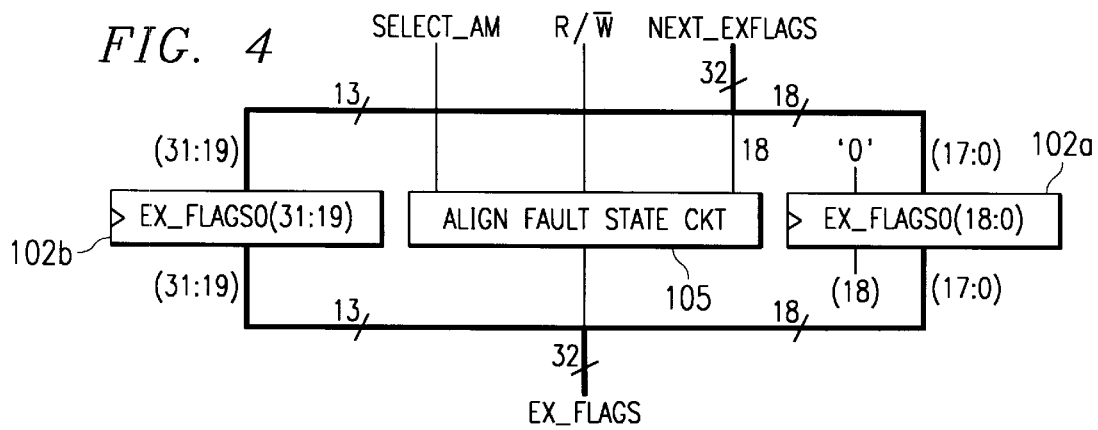
FIG. 4 is a block diagram showing details of the relationship of the alignment fault state circuit illustrated in FIG. 2 and the EFLAGS register.

FIG. 4 is a block diagram illustrating the details of the relationship between alignment fault state circuit 105 and EFLAGS register 102. FIG. 4 reflects the hardware circuit level of this invention. FIG. 4 illustrates three inputs: the SELECT AM signal from bit 18 of control register CR0 101; a R/$\overline{W}$ signal: and a 32-bit NEXT_EFLAGS signal. The R/$\overline{W}$ signal normally indicates a read mode but indicates a write mode when writing to EFLAGS register 102. The NEXT_EFLAGS signal is data to be written into EFLAGS register 102 and is not valid unless the R/$\overline{W}$ signal indicates a write operation. FIG. 4 illustrates a single output, a 32-bit EFLAGS signal corresponding to the read state of EFLAGS register 102.

Bits 0 to 17 of the NEXT_EFLAGS signal are supplied to bits 0 to 17 of a least significant part of EFLAGS register 102a. Bits 0 to 17 of the least significant part of EFLAGS register 102a supply corresponding bits 0 to 17 of the EFLAGS signal when EFLAGS register 102 is read. Similarly, bits 19 to 31 of the NEXT_EFLAGS signal are supplied to bits 19 to 31 of a most significant part of EFLAGS register 102b, which supplies corresponding bits 19 to 31 of the EFLAGS signal when EFLAGS register 102 is read. Note that bit 18 of EFLAGS register 18 is always written into with "0" and its output is not connected.

Alignment fault state circuit 105 receives bit 18 of the NEXT_EFLAGS signal. As will be explained below, writes to this bit may change either the alignment check bit AC or the alignment mask bit AM depending upon the state of the SELECT AM signal. Likewise, alignment fault state circuit 105 supplies the output on bit 18 of the EFLAGS signal. This may provide an output indication of the alignment check bit AC or the alignment mask bit AM depending upon the state of the SELECT AM signal. These outputs are generated according to Table 2:

TABLE 2

| State | Implied AM | AC | SELECT AM | Fault Gate Qualifier | Read Value |
|---|---|---|---|---|---|
| ONE | 0 | 0 | 0 | 0 | 0 |
| TWO | 1 | 0 | 0 | 0 | 0 |
| THREE | 0 | 1 | 0 | 0 | 1 |
| FOUR | 1 | 1 | 0 | 1 | 1 |
| ONE | 0 | 0 | 1 | 0 | 0 |
| TWO | 1 | 0 | 1 | 0 | 1 |
| THREE | 0 | 1 | 1 | 0 | 0 |
| FOUR | 1 | 1 | 1 | 1 | 1 |

The states ONE, TWO, THREE and FOUR are as defined in conjunction with FIG. 3. As indicated in Table 2, SELECT AM is specified independently from alignment mask AM and alignment check AC. From the outside alignment fault state circuit 105 behaves as two separate registers which share the same read and write ports. This design is improved over U.S. patent application Ser. No. 08/478,308, entitled FOUR STATE TOKEN PASSING ALIGNMENT FAULT STATE CIRCUIT FOR MICROPROCESSOR ADDRESS MISALIGNMENT FAULT GENERATION filed Jun. 6, 1995, in that the machine receives the same values of AM and AC on the same input rather than on separate ports.

Figure 5:
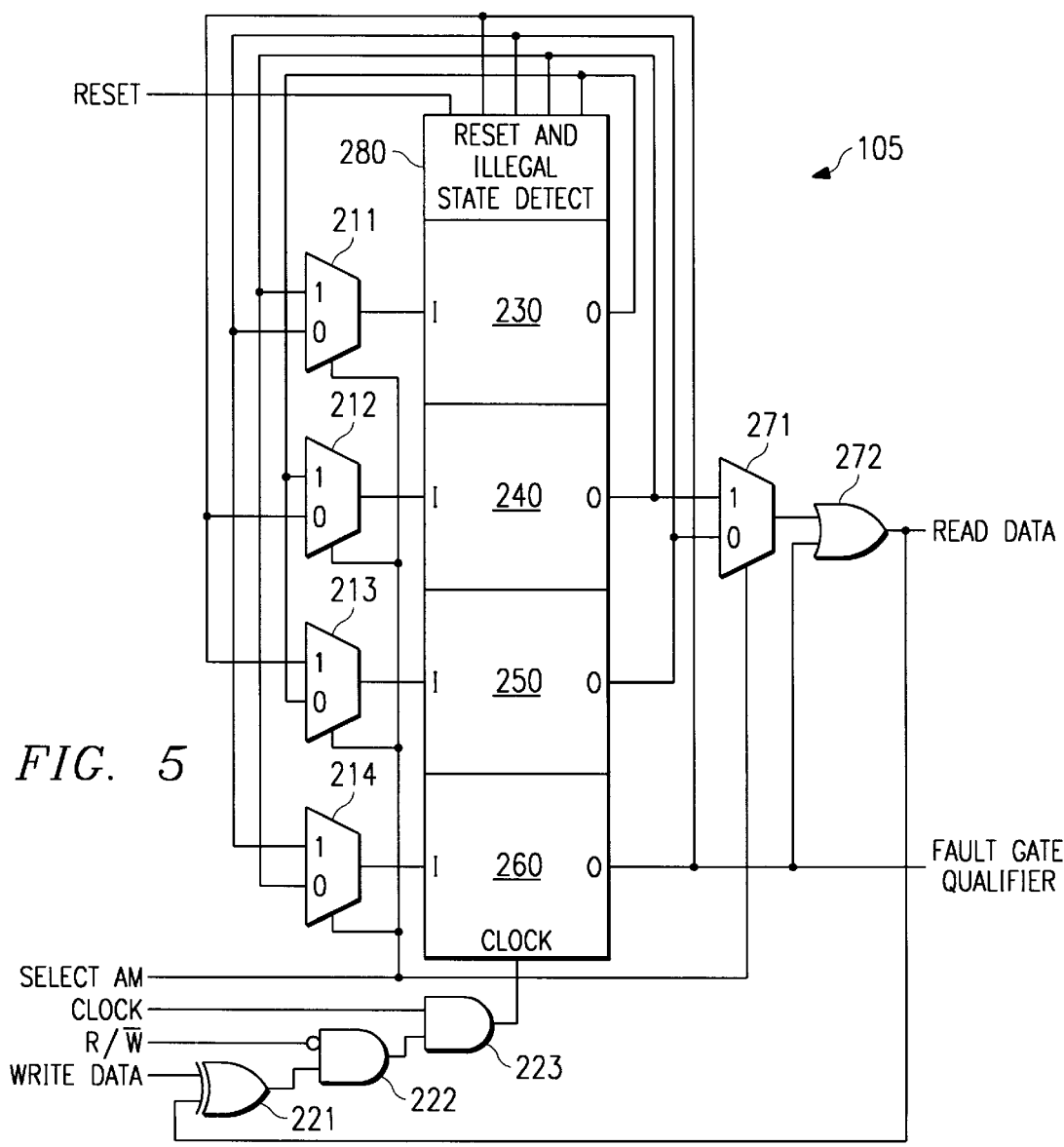
FIG. 5 is a logic diagram of a preferred embodiment of the alignment fault state circuit of this invention.

FIG. 5 is a logic diagram of the preferred embodiment of alignment fault state circuit 105. Alignment fault state circuit 105 includes flip flops 230, 240, 250 and 260. Each of these flip flops is associated with one of the four states illustrated in FIG. 3. Flip flop 230 corresponds to state one, flip flop 240 corresponds to state two, flip flop 250 to state three and flip flop 260 to state four. A single flip flop is set indicating the corresponding state is active. The other flip flops are reset indicating that their corresponding states are inactive. Note that the state of flip flop 260 corresponds to the output fault gate qualifier signal. Input multiplexers 211, 212, 213 and 214 may shift the "1" token left or right depending upon the input conditions and the state of Write Date input. The WRITE DATA input corresponds to bit 18 of the NEXT_EFLAGS signal of FIG. 4. FIG. 5 further illustrates a READ DATA output supplying bit 18 of the EFLAGS signal of FIG. 4. FIG. 5 illustrates a Fault Gate Qualifier signal output corresponding to the state of flip flop 260. Note that flip flops 230, 240, 250 and 260 serve as a source of the current state to input multiplexers 211, 212, 213 and 214.

Alignment fault state circuit 105 includes 4 two input multiplexers 211, 212, 213 and 214. These input multiplexers are connected to the read inputs of flip flops 230, 240, 250 and 260, respectively. Upon receipt of a common CLOCK signal, each flip flop 230, 240, 250 and 260 latches in the data received on its read input. An input CLOCK signal is conditioned by exclusive OR gate 221 and AND gates 222 and 223.

Additional circuits control the generation of output signals. Multiplexer 271 receives the outputs from flip flops 240 and 250. The output of flip flop 240 indicates state two. The output of flip flop 250 indicates state three. Multiplexer 271 is controlled by the SELECT AM signal. If SELECT AM is "1" indicating the signal AM is selected, then multiplexer 271 selects the input from flip flop 240. Thus the output of multiplexer 271 is "1" if the token is in state two and "0" otherwise. If SELECT AM is "0" indicating the signal AC is selected, then multiplexer 271 selects the input from flip flop 250. Thus the output of multiplexer 271 is "1" if the token is in state three and "0" otherwise. The output of multiplexer 271 supplies one input of OR gate 272. The other input to OR gate 272 comes from flip flop 260 which is "1" when the token is in state four and "0" otherwise. Thus OR gate 272 indicates if the token is in state two or state four when SELECT AM indicates the signal AM and if the token is in state three or state four when SELECT AM indicates the signal AC. Thus these output circuits supply an indication of whether AM is ON when SELECT AM selects AM or an indication of whether AC is ON when SELECT AM selects AC. These circuits thus produce the READ DATA output. The READ DATA signal supplies the output on bit 18 of the EFLAGS signal as illustrated in FIG. 4. The READ DATA signal is also fed to exclusive OR gate 221 to condition the CLOCK signal.

Multiplexers 211, 212, 213 and 214 control the input signals supplied to the inputs of flip flops 230, 240, 250 and 260, respectively. Multiplexer 211 supplies the output of flip flop 240 to the input of flip flop 230 if Select AM is "0". Multiplexer 211 supplies the output of flip flop 250 to the input of flip flop 230 if Select AM is "1". Multiplexer 212 supplies the output of flip flop 230 to the input of flip flop 240 if Select AM is "0". Multiplexer 212 supplies the output of flip flop 260 to the input of flip flop 240 if Select AM is "1". Multiplexer 213 supplies the output of flip flop 260 to the input of flip flop 250 if Select AM is "0". Multiplexer 213 supplies the output of flip flop 230 to the input of flip flop 230 if Select AM is "1". Multiplexer 214 supplies the output of flip flop 250 to the input of flip flop 260 if Select AM is "0". Multiplexer 214 supplies the output of flip flop 240 to the input of flip flop 240 if Select AM is "1".

Alignment fault state circuit 105 changes state as follows. Exclusive OR gate 221 detects whether WRITE DATA equals READ DATA. If WRITE DATA equals READ DATA, then the output of exclusive OR gate 221 is "0". This prevents application of the CLOCK signal to flip flops 230, 240, 250 and 260. Thus the state of alignment fault state circuit 105 does not change unless the data to be written differs from the current state. If WRITE DATA does not equal READ DATA, then the output of exclusive OR gate 221 is "1". The output of exclusive OR gate 221 is supplied to a noninverting input of AND gate 222. The R/$\overline{W}$ signal is supplied to an inverting input of AND gate 222. Thus AND gate 222 produces a "1" output only if WRITE DATA does not equal READ DATA and the R/$\overline{W}$ signal indicates the write mode. This output of AND gate 222 conditions the CLOCK signal via AND gate 223. Thus the CLOCK signal is supplied to the common CLOCK signal input of flip flops 230, 240, 250 and 260 only if alignment fault state circuit 105 is in read mode and the data to be written differs from the current state.

Upon receipt of the common CLOCK signal, each flip flop 230, 240, 250 and 260 latches in the signal at its input. Multiplexers 211, 212, 213 and 214 select that signal based upon the state of SELECT AM. If SELECT AM is "0", then flip flop 230 latches the state of flip flop 250, flip flop 240 latches the state of flip flop 260, flip flop 250 latches the state of flip flop 230 and flip flop 260 latches the state of flip flop 240. This has the effect of switching between states one and three or between states two and four, depending upon the initial state. Note that when in states one or three, both flip flops 240 and 260 store "0". Thus when in states one or three exchanging the data stored in these flip flops does not change the state stored in alignment fault state circuit 105. When in states two or four, both flip flops 230 and 250 store "0". Exchanging the data stored in these flip flops when in states two or four does not change the state stored in alignment fault state circuit 105. With SELECT AM equal to "0", only the alignment check AC may be changed. Referring back to FIG. 3, the only transitions permitted by changing alignment check AC are between states one and three and between states two and four. Multiplexers 211, 212, 213 and 214 effect the proper state change regardless of the initial state.

If SELECT AM is "1", then flip flop 230 latches the state of flip flop 240, flip flop 240 latches the state of flip flop 230, flip flop 250 latches the state of flip flop 260 and flip flop 260 latches the state of flip flop 250. This has the effect of switching between states one and two or between states three and four, depending upon the initial state. Note that switching the data stored in the other pair of flip flops would not change the state stored in alignment fault state circuit 105, because both of the other pair of flip flops stores "0". With SELECT AM equal to "1", only the alignment mask AM may be changed. Referring back to FIG. 3, the only transitions permitted by changing alignment mask AM are between states one and two and between states three and four. Multiplexers 211, 212, 213 and 214 effect the proper state change regardless of the initial state.

A reset and illegal state detector 280 controls the initial state of alignment fault state circuit 105 upon RESET. Reset and illegal state detector 280 receives a RESET signal. This RESET signal is active for a predetermined interval following initial powering of the microprocessor and also for the predetermined interval following soft RESET of the microprocessor. When the RESET signal is active, reset and illegal state detector 280 sets flip flop 230 and resets flip flops 240, 250 and 260. Thus alignment fault state logic 105 enters state one. Note that forcing alignment fault state circuit 105 to state one upon RESET is merely a convenient design choice. The reset circuit could just as easily force alignment fault state circuit 105 to any of the other states. This embodiment of the reset circuit merely places alignment fault state circuit 105 in a known state upon initialization corresponding to a state of all "0's" in control register CR0 101 and EFLAGS register 102. It is contemplated that the operating system will write to control register CR0 101 and that the application program will write to EFLAGS register 102 before encountering any program code which needs the information stored in alignment fault state circuit 105. Thus such initialization may not be necessary.

Reset and illegal state detector 280 receives inputs from the outputs of flip flops 230, 240, 250 and 260. This enables detection of an illegal state, such as none of flip flops 230, 240, 250 and 260 being set or more than one of flip flops 230, 240, 250 and 260 being set. These illegal states would not be encountered during normal operation. Upon detection of these illegal states, reset and illegal state detector 280 sets flip flop 230 and resets flip flops 240, 250 and 260, thus entering state one. Thus reset and illegal state detector 280 permits recover from an illegal state.

In accordance with the invention bit 18 of control register CR0 101 will be redefined as a 1-bit machine status register (MSR). This single bit will be accessible for reading and for writing by application programs at the lowest level of privilege. This machine status register is called MVA for move alignment mask. The output of this one bit machine status register generally corresponds to the SELECT AM signal. Microcode controller 110 permits writing a "0" into MVA via a write MVA instruction. This makes the microprocessor behave as if AM were located in bit 18 of the control register CR0 101 and that AC were located in bit 18 of the EFLAGS register 102. Microcode controller 110 also permits writing a "1" into MVA via the write MVA instruction. This makes the microprocessor behave as if AM were located in bit 18 of the EFLAGS register 102 and will not permit the microprocessor to write to the AM bit via a write to control register CR0 101. Thus only instructions that modify EFLAGS register 102 can change the value of AM bit. This state will allow an application program to modify the AM bit at the lowest level of privilege and prevent the operating system from modifying the AM bit by writing to control register CR0 101 even at the highest level of privilege.

The normal functions occur as follows. Writes to EFLAGS register 102 depend upon the status of the SELECT AM signal stored in the SELECT AM register 111. This is generally the same state as stored in the MVA machine status register. If SELECT AM is "0", then a write to bit 18 of EFLAGS register 102 permits alignment fault state circuit 105 to change status to modify AC depending upon the current state and the write data. If SELECT AM is "1", then a write to bit 18 of EFLAGS register 102 permits alignment fault state circuit 105 to change status to modify AC depending upon the current state and the write data. Reads from EFLAGS register 102 depend upon the status of SELECT AM stored in the SELECT AM register. This is generally same state as stored in the MVA machine status register. If SELECT AM is "0", then a read from EFLAGS register 102 will output the current value of AC on bit 18. If SELECT AM "1", then a read from EFLAGS register 102 will output the current value of AM on bit 18. Bits 0 to 17 and 19 to 31 are read from EFLAGS register 102 normally regardless of the state of machine status register MVA. This is illustrated in FIGS. 4 and 5.

Figure 6:
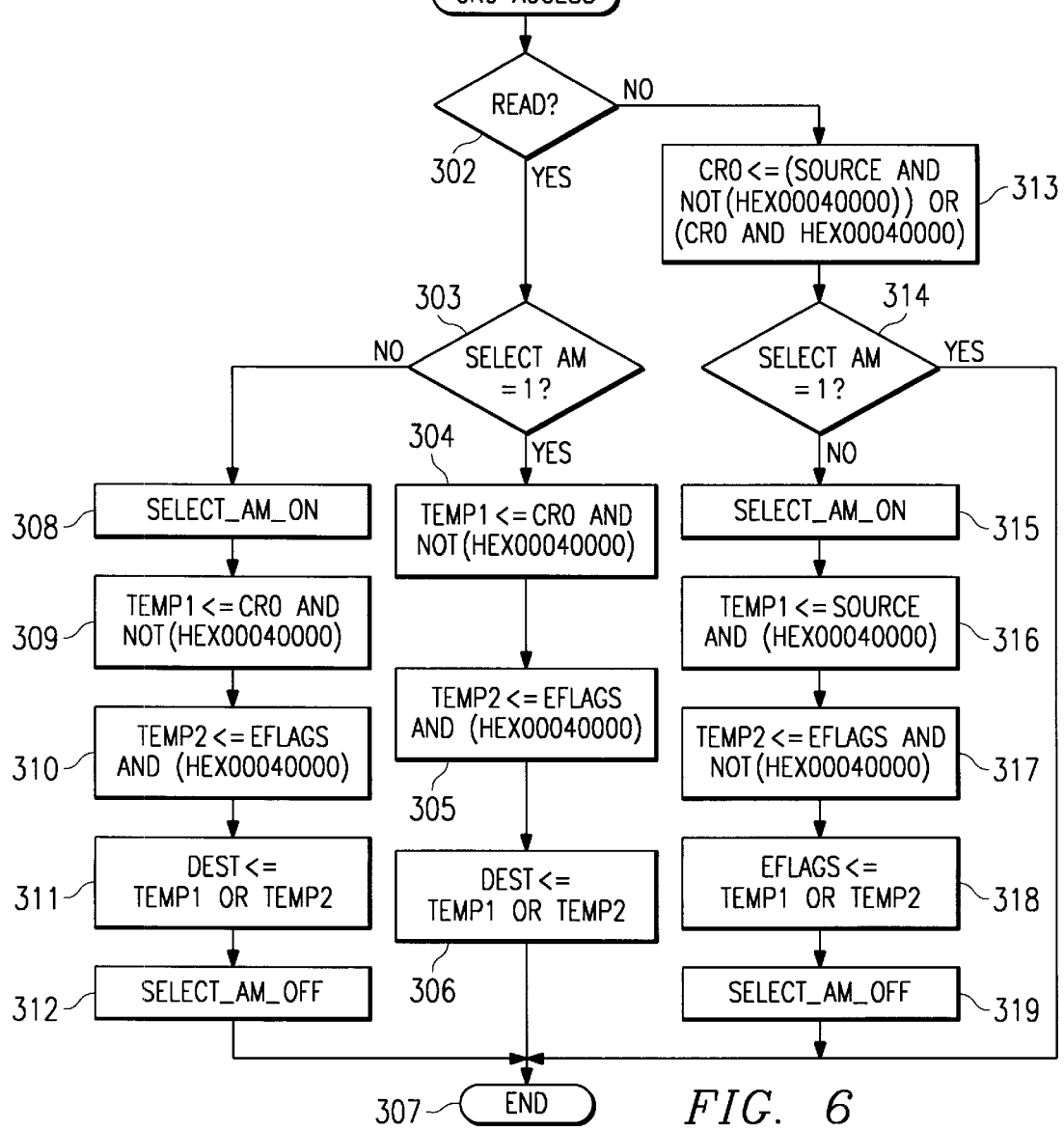
FIG. 6 is a flow chart of a microcode routine used to service accessed to control register CR0.

Accesses to control register CR0 101 are handled by microcode. FIG. 6 illustrates this microcode. This microcode sequence is entered for every access to control register CR0 101 (block 302). If the access to control register CR0 101 is a read (decision block 302), then microcode controller 110 tests the state of CR0.MVA storing the SELECT AM signal. If CR0.MVA is "1" (decision block 303), then a first temporary register Temp1 is loaded with the contents of control register CR0 101 ANDed a mask NOT (Hex00040000) (block 304). This loads Temp1 with contents of control register CR0 101 except that bit 18 is reset. Next a second temporary register Temp2 is loaded with the contents of EFLAGS register 102 ANDed with a mask (Hex00040000) (block 305). This loads Temp1 with contents of bit 18 of EFLAGS register 102 with the other bits reset. Lastly, the contents of Temp1 is ORed with the contents of Temp2 and supplied to the destination of the read (block 306). Thus the destination receives bits 0 to 17 and 19 to 31 of control register CR0 101 and the AM bit read from alignment fault state circuit 105. The microcode sequence ends at block 307.

If CR0.MVA is "0" (decision block 303), then microcode controller 110 issues the SELECT_AM_ON command (block 308). This changes the SELECT AM signal stored in SELECT AM register from "0" to "1" without changing the state of the machine status register MVA. This allows AM to be accessed within alignment fault state circuit 105. Microcode controller 110 then reads the state of bits 0 to 17 and 19 to 31 of control register CR0 101 (block 309) in the same manner as block 304. Bit 18 of EFLAGS register 102 is read (block 310) in the same manner as block 305. The destination data is formed by ORing the data in temporary registers Temp1 and Temp2 (block 311) in the same manner as block 306. Thus the destination receives bits 0 to 17 and 19 to 31 of control register CR0 101 and the AM bit read from alignment fault state circuit 105. Microcode controller 110 then issues the SELECT_AM_OFF command (block 312), restoring the status of the SELECT AM signal. The microcode sequence then ends at block 307. Note that during the interval between the SELECT_AM_ON command and the SELECT_AM_OFF command, the state of the SELECT AM register 111 differs from the state of machine status register MVA.

If the control register CR0 101 access is not a read (decision block 302), then it must be a write. The source data is written into control register CR0 101, with bit 18 masked (block 313). This is achieved by ANDing the SOURCE data with the mask NOT(Hex00040000), ANDing the contents of control register CR0 101 with the mask Hex0004000 and ORing these results. Thus the write to control register CR0 101 does not change the state of the MVA bit 18. Note that this prohibition may be in hardware rather than in microcode. The microcode sequence checks the status of CR0.MVA storing the SELECT AM signal (decision block 314). If CR0.MVA is "1" (decision block 314), then any write to control register CR0 101 cannot change the status of SELECT AM. Thus the microcode sequence exits at block 307. If CR0.MVA is "0" (decision block 314), then writes to control register CR0 101 are permitted to change the status of SELECT AM. Microcode controller 110 issues the SELECT_AM_ON command (block 315). This changes the SELECT AM signal stored in SELECT AM register 111 from "0" to "1" without changing the state of the machine status register MVA. This allows AM to be accessed within alignment fault state circuit 105. The source data is ANDed with the mask Hex0004000 (block 316). This selects only bit 18 of the source data, which is stored in a first temporary register Temp1 (block 316). The microcode sequence loads a second temporary register Temp2 with the contents of EFLAGS register 102 ANDed a mask NOT(Hex00040000) (block 317). This loads Temp2 with contents of EFLAGS register 101 except that bit 18 is reset. Next the EFLAGS register 101 is loaded with an OR of the first temporary register Temp1 and the second temporary register Temp2. Bits 0 to 17 and 19 to 31 of EFLAGS register 102 are thus unchanged as these bits come from the second temporary register Temp2. Bit 18 of EFLAGS register 102 is written with bit 18 of the source data stored in the first temporary register Temp1. This write to bit 18 of the EFLAGS register 101 is supplied to alignment fault state circuit 105 and may change the state of AM or not depending upon the current state and the write data. Microcode controller 110 issues the SELECT_AM_OFF command (block 319), restoring the status of the SELECT AM signal stored in SELECT AM register 110. The microcode sequence then ends at block 307. Note that during the interval between the SELECT_AM_ON command and the SELECT_AM_OFF command, the state of the SELECT AM register 111 differs from the state of machine status register MVA.

The alignment fault state circuit need not have exactly four latches. Any arrangement with more than three latches which has four legal states may be used. The input circuits must shift between the states illustrated in FIG. 2 based upon the current state, the state of SELECT AM and the write data received at the data port. Output circuits are needed to provide the requested output state at the data port based upon the state of SELECT AM. It would be advantageous to provide a reset and illegal state detector to set the set of latches to a predetermined legal state upon reset or detection of an illegal state.

What is claimed is:

1. An address alignment fault state circuit comprising:
   a first control register having a plurality of bits including a first predetermined bit storing a select alignment masking signal;
   a second control register having a plurality of bits and omitting a second predetermined bit;

an alignment fault state circuit connected to said first control register to receive said select alignment masking signal stored in said first predetermined bit, said alignment fault state circuits including a first, second, third and fourth latch each latch holding either a first state indicating location of a token therein or a second state indicating said token is not located therein, said token located within only one of said first, second, third and fourth latches at any time, input circuit operative
(1) to shift said token from said first latch to said third latch upon receipt of data having a first state at said data port when said select alignment masking signal has said first state and said token is located in said first latch,
(2) to shift said token from said first latch to said second latch upon receipt of data having said first state at said data port when said select alignment masking signal has a second state opposite to said first state and said token is located in said first latch,
(3) to shift said token from said second latch to said first latch upon receipt of data at said data port having said second state when said select alignment masking signal has said first state and said token is located in said second latch,
(4) to shift said token from said second latch to said fourth latch upon receipt data at said data port having said first state when said select alignment masking signal has said second state and said token is located in said second latch,
(5) to shift said token from said third latch to said fourth latch upon receipt of data at said data port having said first state when said select alignment masking signal has said second state and said token is located in said third latch,
(6) to shift said token from said third latch to said first latch upon receipt of data at said data port having said second state when said select alignment masking signal has said second state and said token is located in said third latch,
(7) to shift said token from said fourth latch to said second latch upon receipt of data having said second state when said select alignment masking signal has said second state and said token is located in said fourth latch, and
(8) to shift said token from said fourth latch to said third latch upon receipt of data having said second state when said select alignment masking signal has said first state and said token is located in said fourth latch; and an output circuit connected to said fourth latch, said output circuit generating an alignment fault qualifier signal enabling generation of an address alignment fault signal if said token is located in said fourth latch.

2. The address alignment fault state circuit of claim 1, further including:
an instruction responsive circuit responsive (1) to a select alignment masking on command to set said first predetermined bit of said second control register to said first state, thereby causing said select alignment masking signal to have said first state, and (2) to a select alignment masking off command to set said first predetermined bit of said second control register to said second state, thereby causing said select alignment masking signal to have said second state.

3. The address alignment fault state circuit of claim 2, further including:
a source of instructions including
an alignment check on instruction executing at an application program privilege level indicating the application program enables generation of an address alignment fault state signal consisting of a write to said second control register having said second predetermined bit of said first state;
an alignment check off instruction executing at said application program privilege level indicating the application program disables generation of an address alignment fault state signal consisting of a write to said second control register having said second predetermined bit of said second state;
an alignment mask permit instruction executing at an operating system privilege level indicating the operating system permits generation of an address alignment fault signal if said application program has enabled generation of an address alignment fault signal via said alignment check on instruction consisting of a write to said second register having said second predetermined bit of said first state, and
an alignment mask prohibit instruction executing at said operating system privilege level indicating the operating system prohibits generation of an address alignment fault signal regardless or whether said application program has enabled generation of an address alignment fault signal via said alignment check on instruction consisting of a write to said first register having said first predetermined bit of said second state;
said instruction responsive circuit further includes a microcode sequence responsive to writes to said first control register specifying source data (1) to write all bits of said source data except said first predetermined bit into said first register, (2) if said select alignment masking signal has said second state issuing a select alignment masking on command, then writing said source data for said first predetermined bit into said second predetermined bit of said second control register, and then issuing said select alignment making off command.

4. The address alignment fault state circuit of claim 2, further including:
said an alignment fault state circuit further includes
a multiplexer having a first input connected to said second latch, a second input connected to said third latch, a control input receiving said select alignment masking signal and an output, said multiplexer selecting for output said first input if said select alignment has said first state and said second input if said select alignment has said second state, and
an OR gate having a first input connected to said output of said multiplexer, a second input connected to said fourth latch and an output forming a read port for said alignment fault state circuit.

5. The address alignment fault state circuit of claim 4, further including:
said instruction responsive circuit further includes a microcode sequence responsive to reads from said first control register specifying a destination (1) if said select alignment masking signal has said first state supplying to said destination all bits of said first control register except said first predetermined bit stored in said first control register and to supply to said destination said first predetermined bits said output of said data port of said alignment fault state circuit, and (2) if said select alignment masking signal has said first state issuing said select alignment masking on command, supplying said destination all bits of said first control register except said first predetermined bit stored in said first control register and to supply to said destination said first predetermined bits said output of said data port of said alignment fault state circuit, and then issuing said select alignment making off command.

6. The address alignment fault state circuit of claim 1, wherein:

said instruction responsive circuit further includes a reset input for shifting said token to a first latch upon receipt of a reset signal.

7. The address alignment fault state circuit of claim 6, further comprising:

an illegal state detection circuit connected to said first, second, third and fourth latches for shifting said token to said first latch upon detection that more than one of said first, second, third and fourth latches holds said first state.

8. The address alignment fault state circuit of claim 1, wherein:

each of said first, second, third and fourth latches includes an input, an output and a clock input, each of said first, second, third and fourth latches storing data received at said input upon receipt of a clock signal at said clock input, each of said first, second, third and fourth latches producing an output signal at said output corresponding to said state held therein;

said input circuit includes a first multiplexer having a first input connected to said second latch, a second input connected to said third latch, an output connected to an input of said first latch and a control input receiving said select alignment masking signal, a second multiplexer having a first input connected to said first latch, a second input connected to said fourth latch, an output connected to an input of said second latch and a control input receiving said select alignment masking signal, a third multiplexer having a first input connected to said fourth latch, a second input connected to said first latch, an output connected to an input of said third latch and a control input receiving said select alignment masking signal, a fourth multiplexer having a first input connected to said third latch, a second input connected to said second latch, an output connected to an input of said fourth latch and a control input receiving said select alignment masking signal, a fifth multiplexer having a first input connected to said second latch, a second input connected to said third latch, a control input receiving said select alignment masking signal and an output, an OR gate having a first input connected to said output of said multiplexer, a second input connected to said fourth latch and an out put forming a read port for said alignment fault state circuit, an exclusive NOR gate having a first input connected to said OR gate, a second input connected to said data port, a first AND gate having a first inverting input receiving a receiving a R/$\overline{W}$ signal, a second noninverting input connected to said output of said exclusive NOR gate and an output, and a second AND gate having a first input receiving a clock signal, a second input connected to said output of said first AND gate and an output connected to said clock inputs of said first, second, third and fourth latches.

9. An address alignment fault circuit comprising:

a first control register having a plurality of bits including a first predetermined bit storing a select alignment masking signal;

a second control register having a plurality of bits and omitting a second predetermined bit;

an alignment fault state circuit connected to said first control register to receive said select alignment masking signal stored in said first predetermined bit, said alignment fault state circuits including a first, second, third and fourth latch, each latch holding either a first state indicating location of a token therein or a second state indicating said token is not located therein, said token located within only one of said first, second, third and fourth latches at any time, input circuit operative (1) to shift said token from said first latch to said third latch upon receipt of data having a first state at said data port when said select alignment masking signal has said first state and said token is located in said first latch, (2) to shift said token from said first latch to said second latch upon receipt of data having said first state at said data port when said select alignment masking signal has a second state opposite to said first state and said token is located in said first latch, (3) to shift said token from said second latch to said first latch upon receipt of data at said data port having said second state when said select alignment masking signal has said first state and said token is located in said second latch, (4) to shift said token from said second latch to said fourth latch upon receipt data at said data port having said first state when said select alignment masking signal has said second state and said token is located in said second latch, (5) to shift said token from said third latch to said fourth latch upon receipt of data at said data port having said first state when said select alignment masking signal has said second state and said token is located in said third latch, (6) to shift said token from said third latch to said first latch upon receipt of data at said data port having said second state when said select alignment masking signal has said second state and said token is located in said third latch, (7) to shift said token from said fourth latch to said second latch upon receipt of data having said second state when said select alignment masking signal has said second state and said token is located in said fourth latch, and (8) to shift said token from said fourth latch to said third latch upon receipt of data having said second state when said select alignment masking signal has said first state and said token is located in said fourth latch; and an output circuit connected to said fourth latch, said output circuit generating an alignment fault qualifier signal enabling generation of an address alignment fault signal if said token is located in said fourth latch;

an address alignment detector receiving a set of least significant bits of address signal and a data size indicator, said address alignment detector generating an alignment signal if said address signal refers to an address misaligned to a data size corresponding to said data size indicator; and an AND gate connected to said output circuit and said address alignment detector for generating an alignment fault signal if said output circuit generates said alignment fault qualifier signal and said address alignment detector generates said alignment signal.

10. The address alignment fault circuit of claim 9, further including:

an instruction responsive circuit responsive (1) to a select alignment masking on command to set said first predetermined bit of said second control register to said first state, thereby causing said select alignment masking signal to have said first state, and (2) to a select alignment masking off command to set said first predetermined bit of said second control register to said second state, thereby causing said select alignment masking signal to have said second state.

11. The address alignment fault circuit of claim 10, further including:

a source of instructions including an alignment check on instruction executing at an application program privilege level indicating the application program enables generation of an address alignment fault state signal consisting of a write to said second control register having said second predetermined bit of said first state;

an alignment check off instruction executing at said application program privilege level indicating the application program disables generation of an address alignment fault state signal consisting of a write to said second control register having said second predetermined bit of said second state;

an alignment mask permit instruction executing at an operating system privilege level indicating the operating system permits generation of an address alignment fault signal if said application program has enabled generation of an address alignment fault signal via said alignment check on instruction consisting of a write to said second register having said second predetermined bit of said first state, and an alignment mask prohibit instruction executing at said operating system privilege level indicating the operating system prohibits generation of an address alignment fault signal regardless or whether said application program has enabled generation of an address alignment fault signal via said alignment check on instruction consisting of a write to said first register having said first predetermined bit of said second state;

said instruction responsive circuit further includes a microcode sequence responsive to writes to said first control register specifying source data (1) to write all bits of said source data except said first predetermined bit into said first register, (2) if said select alignment masking signal has said second state issuing a select alignment masking on command, then writing said source data for said first predetermined bit into said second predetermined bit of said second control register, and then issuing said select alignment making off command.

12. The address alignment fault circuit of claim 10, further including:

said an alignment fault state circuit further includes a multiplexer having a first input connected to said second latch, a second input connected to said third latch, a control input receiving said select alignment masking signal and an output, said multiplexer selecting for output said first input if said select alignment has said first state and said second input if said select alignment has said second state, and an OR gate having a first input connected to said output of said multiplexer, a second input connected to said fourth latch and an output forming a read port for said alignment fault state circuit.

13. The address alignment fault circuit of claim 12, further including:

said instruction responsive circuit further includes a microcode sequence responsive to reads from said first control register specifying a destination (1) if said select alignment masking signal has said first state supplying to said destination all bits of said first control register except said first predetermined bit stored in said first control register and to supply to said destination said first predetermined bits said output of said data port of said alignment fault state circuit, and (2) if said select alignment masking signal has said first state issuing said select alignment masking on command, supplying said destination all bits of said first control register except said first predetermined bit stored in said first control register and to supply to said destination said first predetermined bits said output of said data port of said alignment fault state circuit, and then issuing said select alignment making off command.

14. The address alignment fault circuit of claim 9, wherein:

said instruction responsive circuit further includes a reset input for shifting said token to a first latch upon receipt of a reset signal.

15. The address alignment fault circuit of claim 14, further comprising:

an illegal state detection circuit connected to said first, second, third and fourth latches for shifting said token to said first latch upon detection that more than one of said first, second, third and fourth latches holds said first state.

16. The address alignment fault circuit of claim 9, wherein:

each of said first, second, third and fourth latches includes an input, an output and a clock input, each of said first, second, third and fourth latches storing data received at said input upon receipt of a clock signal at said clock input, each of said first, second, third and fourth latches producing an output signal at said output corresponding to said state held therein;

said input circuit includes a first multiplexer having a first input connected to said second latch, a second input connected to said third latch, an output connected to an input of said first latch and a control input receiving said select alignment masking signal, a second multiplexer having a first input connected to said first latch, a second input connected to said fourth latch, an output connected to an input of said second latch and a control input receiving said select alignment masking signal, a third multiplexer having a first input connected to said fourth latch, a second input connected to said first latch, an output connected to an input of said third latch and a control input receiving said select alignment masking signal, a fourth multiplexer having a first input connected to said third latch, a second input connected to said second latch, an output connected to an input of said fourth latch and a control input receiving said select alignment masking signal, a fifth multiplexer having a first input connected to said second latch, a second input connected to said third latch, a control input receiving said select alignment masking signal and an output, an OR gate having a first input connected to said output of said multiplexer, a second input connected to said fourth latch and an output forming a read port for said alignment fault state circuit, an exclusive NOR gate having a first input connected to said OR gate, a second input connected to said data port, a first AND gate having a first inverting input receiving a receiving a R/W̄ signal, a second noninverting input connected to said output of said exclusive NOR gate and an output, and a second AND gate having a first input receiving a clock signal, a second input connected to said output of said first AND gate and an output connected to said clock inputs of said first, second, third and fourth latches.

17. An address alignment fault state circuit comprising:
a first control register having a plurality of bits including a first predetermined bit storing a select alignment masking signal;
a second control register having a plurality of bits and omitting a second predetermined bit;
an alignment fault state circuit connected to said first control register to receive said select alignment masking signal stored in said first predetermined bit, said alignment fault state circuits including
  a set of at least three latches, each latch holding either a first state or a second state, said set of at least three latches having four valid states,
  input circuit operative
    (1) to shift said set of at least three latches from said first valid state to said third valid state upon receipt of data having a first state at said data port when said select alignment masking signal has said first state and said set of at least three latches has first valid state,
    (2) to shift said set of at least three latches from said first valid state to said second valid states upon receipt of data having said first state at said data port when said masking signal has a second state opposite to said first state and said set of three latches has said first valid state,
    (3) to shift said set of at least three latches from said second valid state to said first valid state upon receipt of data at said data port having said second state when said select alignment masking signal has said first state and said set of at least three latches has said second valid state,
    (4) to shift said set of at least three latches from said second valid state to said fourth valid state upon receipt data at said data port having said first state when said select alignment masking signal has said second state and said set of at least three latches has said second valid state,
    (5) to shift said set of at least three latches from said third valid state to said fourth valid state upon receipt of data at said data port having said first state when said select alignment masking signal has said second state and said set of at least three latches has said third valid state,
    (6) to shift said set of at least three latches from said third valid state to said first valid state upon receipt of data at said data port having said second state when said select alignment masking signal has said second state and said set of at least three latches has said third valid state,
    (7) to shift said set of at least three latches from said fourth valid state to said second valid state upon receipt of data having said second state when said select alignment masking signal has said second state and said set of at least three latches has said fourth valid state, and
    (8) to shift said set of at least three latches from said fourth valid state to said third valid state upon receipt of data having said second state when said select alignment masking signal has said first state and said set of at least three latches has said fourth valid state; and
  an output circuit connected to said set of at least three latches, said output circuit generating an alignment fault qualifier signal enabling generation of an address alignment fault signal if said set of at least three latches has said fourth valid state.

18. The address alignment fault state circuit of claim 17, further including:
an instruction responsive circuit responsive (1) to a select alignment masking on command to set said first predetermined bit of said second control register to said first state, thereby causing said select alignment masking signal to have said first state, and (2) to a select alignment masking off command to set said first predetermined bit of said second control register to said second state, thereby causing said select alignment masking signal to have said second state.

19. The address alignment fault state circuit of claim 18, further including:
a source of instructions including
  an alignment check on instruction executing at an application program privilege level indicating the application program enables generation of an address alignment fault state signal consisting of a write to said second control register having said second predetermined bit of said first state;
  an alignment check off instruction executing at said application program privilege level indicating the application program disables generation of an address alignment fault state signal consisting of a write to said second control register having said second predetermined bit of said second state;
  an alignment mask permit instruction executing at an operating system privilege level indicating the operating system permits generation of an address alignment fault signal if said application program has enabled generation of an address alignment fault signal via said alignment check on instruction consisting of a write to said second register having said second predetermined bit of said first state, and
  an alignment mask prohibit instruction executing at said operating system privilege level indicating the operating system prohibits generation of an address alignment fault signal regardless or whether said application program has enabled generation of an address alignment fault signal via said alignment check on instruction consisting of a write to said first register having said first predetermined bit of said second state;

said instruction responsive circuit further includes a microcode sequence responsive to writes to said first control register specifying source data (1) to write all bits of said source data except said first predetermined bit into said first register, (2) if said select alignment masking signal has said second state issuing a select alignment masking on command, then writing said source data for said first predetermined bit into said second predetermined bit of said second control register, and then issuing said select alignment making off command.

20. The address alignment fault state circuit of claim 18, further including:

said an alignment fault state circuit further includes
a second output circuit connected to said set of at least three latches
for generating an output on a read port of said alignment fault state circuit in said first state if said set of three latches has said second valid state or said fourth valid state and said select alignment has said first state,
for generating an output on said read port of said alignment fault state circuit in said second state if said set of three latches has said first valid state or said third valid state and said select alignment has said first state,
for generating an output on a read port of said alignment fault state circuit in said first state if said set of three latches has said third valid state or said fourth valid state and said select alignment has said second state, and
for generating an output on said read port of said alignment fault state circuit in said second state if said set of three latches has said first valid state or said second valid state and said select alignment has said second state.

21. The address alignment fault state circuit of claim 20, further including:

said instruction responsive circuit further includes a microcode sequence responsive to reads from said first control register specifying a destination (1) if said select alignment masking signal has said first state supplying to said destination all bits of said first control register except said first predetermined bit stored in said first control register and to supply to said destination said first predetermined bits said output of said data port of said alignment fault state circuit, and (2) if said select alignment masking signal has said first state issuing said select alignment masking on command, supplying said destination all bits of said first control register except said first predetermined bit stored in said first control register and to supply to said destination said first predetermined bits said output of said data port of said alignment fault state circuit, and then issuing said select alignment making off command.

22. The address alignment fault state circuit of claim 17, wherein:

said instruction responsive circuit further includes a reset input for shifting said set of at least three latches to said first valid state upon receipt of a reset signal.

23. The address alignment fault state circuit of claim 22, further comprising:

an illegal state detection circuit connected to said set of at least three latches for shifting said set of at least three latches to said first valid state upon detection of an invalid state.

24. An address alignment fault circuit comprising:

a first control register having a plurality of bits including a first predetermined bit storing a select alignment masking signal;

a second control register having a plurality of bits and omitting a second predetermined bit;

an alignment fault state circuit connected to said first control register to receive said select alignment masking signal stored in said first predetermined bit, said alignment fault state circuits including an address alignment detector receiving a set of least significant bits of address signal and a data size indicator, said address alignment detector generating an alignment signal if said address signal refers to an address misaligned to a data size corresponding to said data size indicator; and a set of at least three latches, each latch holding either a first state or a second state, said set of at least three latches having four valid states, input circuit operative
(1) to shift said set of at least three latches from said first valid state to said third valid state upon receipt of data having a first state at said data port when said select alignment masking signal has said first state and said set of at least three latches has first valid state,
(2) to shift said set of at least three latches from said first valid state to said second valid states upon receipt of data having said first state at said data port when said masking signal has a second state opposite to said first state and said set of three latches has said first valid state,
(3) to shift said set of at least three latches from said second valid state to said first valid state upon receipt of data at said data port having said second state when said select alignment masking signal has said first state and said set of at least three latches has said second valid state,
(4) to shift said set of at least three latches from said second valid state to said fourth valid state upon receipt data at said data port having said first state when said select alignment masking signal has said second state and said set of at least three latches has said second valid state,
(5) to shift said set of at least three latches from said third valid state to said fourth valid state upon receipt of data at said data port having said first state when said select alignment masking signal has said second state and said set of at least three latches has said third valid state,
(6) to shift said set of at least three latches from said third valid state to said first valid state upon receipt of data at said data port having said second state when said select alignment masking signal has said second state and said set of at least three latches has said third valid state,
(7) to shift said set of at least three latches from said fourth valid state to said second valid state upon receipt of data having said second state when said select alignment masking signal has said second state and said set of at least three latches has said fourth valid state, and
(8) to shift said set of at least three latches from said fourth valid state to said third valid state upon receipt of data having said second state when said select alignment masking signal has said first state and said set of at least three latches has said fourth valid state;

an output circuit connected to said set of at least three latches, said output circuit generating an alignment fault qualifier signal enabling generation of an address alignment fault signal if said set of at least three latches has said fourth valid state;

an address alignment detector receiving a set of least significant bits of address signal and a data size indicator, said address alignment detector generating an alignment signal if said address signal refers to an address misaligned to a data size corresponding to said data size indicator; and an AND gate connected to said output circuit and said address alignment detector for generating an alignment fault signal if said output circuit generates said alignment fault qualifier signal and said address alignment detector generates said alignment signal.

25. The address alignment fault circuit of claim 24, further including:

an instruction responsive circuit responsive (1) to a select alignment masking on command to set said first predetermined bit of said second control register to said first state, thereby causing said select alignment masking signal to have said first state, and (2) to a select alignment masking off command to set said first predetermined bit of said second control register to said second state, thereby causing said select alignment masking signal to have said second state.

26. The address alignment fault circuit of claim 25, further including:

a source of instructions including an alignment check on instruction executing at an application program privilege level indicating the application program enables generation of an address alignment fault state signal consisting of a write to said second control register having said second predetermined bit of said first state;

an alignment check off instruction executing at said application program privilege level indicating the application program disables generation of an address alignment fault state signal consisting of a write to said second control register having said second predetermined bit of said second state;

an alignment mask permit instruction executing at an operating system privilege level indicating the operating system permits generation of an address alignment fault signal if said application program has enabled generation of an address alignment fault signal via said alignment check on instruction consisting of a write to said second register having said second predetermined bit of said first state, and an alignment mask prohibit instruction executing at said operating system privilege level indicating the operating system prohibits generation of an address alignment fault signal regardless or whether said application program has enabled generation of an address alignment fault signal via said alignment check on instruction consisting of a write to said first register having said first predetermined bit of said second state;

said instruction responsive circuit further includes a microcode sequence responsive to writes to said first control register specifying source data (1) to write all bits of said source data except said first predetermined bit into said first register, (2) if said select alignment masking signal has said second state issuing a select alignment masking on command, then writing said source data for said first predetermined bit into said second predetermined bit of said second control register, and then issuing said select alignment making off command.

27. The address alignment fault state circuit of claim 25, further including:

said an alignment fault state circuit further includes
a second output circuit connected to said set of at least three latches
for generating an output on a read port of said alignment fault state circuit in said first state if said set of three latches has said second valid state or said fourth valid state and said select alignment has said first state,
for generating an output on said read port of said alignment fault state circuit in said second state if said set of three latches has said first valid state or said third valid state and said select alignment has said first state,
for generating an output on a read port of said alignment fault state circuit in said first state if said set of three latches has said third valid state or said fourth valid state and said select alignment has said second state, and
for generating an output on said read port of said alignment fault state circuit in said second state if said set of three latches has said first valid state or said second valid state and said select alignment has said second state.

28. The address alignment fault circuit of claim 27, further including:

said instruction responsive circuit further includes a microcode sequence responsive to reads from said first control register specifying a destination (1) if said select alignment masking signal has said first state supplying to said destination all bits of said first control register except said first predetermined bit stored in said first control register and to supply to said destination said first predetermined bits said output of said data port of said alignment fault state circuit, and (2) if said select alignment masking signal has said first state issuing said select alignment masking on command, supplying said destination all bits of said first control register except said first predetermined bit stored in said first control register and to supply to said destination said first predetermined bits said output of said data port of said alignment fault state circuit, and then issuing said select alignment making off command.

29. The address alignment fault circuit of claim 24, wherein:

said instruction responsive circuit further includes a reset input for shifting said token to a first latch upon receipt of a reset signal.

30. The address alignment fault circuit of claim 29, further comprising:

an illegal state detection circuit connected to said set of three latches for shifting said set of three latches to said first valid state upon detection that more than one of said first, second, third and fourth latches holds said first state.

* * * * *

UNITED STATES PATENT AND TRADEMARK OFFICE
CERTIFICATE OF CORRECTION

PATENT NO. : 5,983,370
DATED : November 9, 1999
INVENTOR(S) : Thimothy D. Anderson Page 1 of 1

It is certified that error appears in the above-identified patent and that said Letters Patent is hereby corrected as shown below:

Title Page:
Insert Item [60] under Related U.S. Application Data --Provisional Application No. 60/029,399 October 30, 1996.--

Signed and Sealed this

Nineteenth Day of June, 2001

Attest:

NICHOLAS P. GODICI
Attesting Officer
*Acting Director of the United States Patent and Trademark Office*